US00RE37618E

(19) United States
(12) Reissued Patent
Helferich

(10) Patent Number: US RE37,618 E
(45) Date of Reissued Patent: Apr. 2, 2002

(54) ANALOG/DIGITAL DATA STORAGE SYSTEM

(76) Inventor: Richard J. Helferich, 154 Donegal Ave., Newbury Park, CA (US) 91320

(21) Appl. No.: 08/816,205

(22) Filed: Apr. 11, 1997

Related U.S. Patent Documents

Reissue of:
(64) Patent No.: 4,905,003
Issued: Feb. 27, 1990
Appl. No.: 07/077,496
Filed: Jul. 24, 1987

U.S. Applications:

(63) Continuation of application No. 08/229,744, filed on Apr. 19, 1994, now abandoned, which is a continuation of application No. 07/761,172, filed on Aug. 30, 1991, now abandoned.

(51) Int. Cl.[7] ..... H03M 1/00
(52) U.S. Cl. ..... 341/110; 341/122; 379/59; 379/88; 455/68
(58) Field of Search ..... 341/110, 122, 341/144, 155, 157, 200; 379/88.28; 455/68, 412; 704/200, 201, 258

(56) References Cited

U.S. PATENT DOCUMENTS

| | | | | |
|---|---|---|---|---|
| 3,073,896 A | * | 1/1963 | James | 178/6 |
| 3,219,934 A | * | 11/1965 | Kalfaian | 328/15 |
| 3,349,184 A | * | 10/1967 | Morgan | 179/15.55 |
| 3,437,760 A | * | 4/1969 | Kawashima et al. | 179/15 |
| 3,466,392 A | | 9/1969 | Calfee et al. | |

(List continued on next page.)

FOREIGN PATENT DOCUMENTS

| | | |
|---|---|---|
| DE | 0 219 559 A | 4/1987 |
| DK | 2 715 332 | 10/1978 |
| EP | WO 83 01548 | 4/1983 |

(List continued on next page.)

OTHER PUBLICATIONS

Analog–Digital Conversion Handbook pgs. I–2 and 3; I–84 to I–109; and II–46 to II–53, Jun. 1972.*
Z.H. Meiksin and P.C. Thackray, Electronic Design with off the shelf Integrated Circuits 1980.*
Advertisement for "Shinwa" by ICM Communications, Radio Communications Report Apr. 15, 1987 pp. 28, 37–38.*

(List continued on next page.)

*Primary Examiner*—Brian Young
(74) *Attorney, Agent, or Firm*—Zoltick Technology Law Group, PLLC

(57) ABSTRACT

An analog to digital data storage system includes receiver means for receiving an incoming signal carrying an analog component from a suitable transmitter. The analog signal is preferably preceded by a designated address code which is specific to a particular data storage system. The system further includes enable means activated by the incoming signal to emit an enable signal (logic high) to activate the system circuitry. The enable means may comprise a decoder which has been programmed to recognize an address code specified to a particular receiver or group of receivers or may be activated simply by the incoming signal without an address code, to emit the enable signal. The system also includes conversion means for converting the incoming analog data to digital format and memory means for storing the converted digital data. The conversion means further includes circuitry for reconverting a digital signal to analog format. Control means are provided for activating the conversion means and the digital memory storage means responsive to the enable signal from the decoder means. In the preferred embodiment, the control means also acts to deactivate the conversion means and memory means at the completion of the message or after a predetermined period of time. Switching means for included for activating the conversion means and the memory means for playback in analog format of any stored messages. The system further includes amplifier means for listening to incoming analog signals and playback of stored messages.

109 Claims, 5 Drawing Sheets

U.S. PATENT DOCUMENTS

| | | | | | |
|---|---|---|---|---|---|
| 3,470,472 | A | * | 9/1969 | Suzuki et al. | 325/18 |
| 3,651,413 | A | * | 3/1972 | Wycoff | 325/492 |
| 3,654,560 | A | * | 4/1972 | Cath et al. | 340/34 TNT |
| 3,659,048 | A | * | 4/1972 | Zuerblis et al. | 178/66 A |
| 3,662,380 | A | * | 5/1972 | Cargile | 340/347 AD |
| 3,716,848 | A | * | 2/1973 | Schonholtz et al. | 340/311 |
| 3,731,279 | A | * | 5/1973 | Halsall et al. | 340/347 AD |
| 3,740,488 | A | * | 6/1973 | Linfield et al. | 179/82 |
| 3,783,384 | A | * | 1/1974 | Wycoff | 325/55 |
| 3,909,811 | A | * | 9/1975 | Adler | 340/189 |
| 3,934,094 | A | | 1/1976 | Kobayashi | |
| 3,936,610 | A | * | 2/1976 | Schiffman | 179/15.55 |
| 3,947,832 | A | * | 3/1976 | Rosgen et al. | 340/224 |
| 3,950,607 | A | * | 4/1976 | Southworth et al. | 178/6 |
| 3,958,235 | A | * | 5/1976 | Duffy | 340/336 |
| 4,042,906 | A | * | 8/1977 | Ezell | 367/67 |
| 4,124,773 | A | * | 11/1978 | Elkins | 179/2 |
| 4,181,893 | A | * | 1/1980 | Ehmke | 325/492 |
| 4,182,989 | A | | 1/1980 | Endo et al. | |
| 4,233,500 | A | * | 11/1980 | Cordill | 340/347 AD |
| 4,264,898 | A | * | 4/1981 | Barman et al. | 340/347 AD |
| 4,356,519 | A | * | 10/1982 | Cogdell, Jr. | 179/2 A |
| 4,371,752 | A | * | 2/1983 | Matthews et al. | 179/7.1 TD |
| 4,408,099 | A | * | 10/1983 | Ishii | 179/2 EC |
| 4,416,813 | A | | 11/1983 | Ikeda et al. | |
| 4,443,787 | A | * | 4/1984 | Denk et al. | 340/347 D |
| 4,468,813 | A | * | 8/1984 | Burke et al. | 455/38 |
| 4,479,124 | A | * | 10/1984 | Rodriquez et al. | 340/825.44 |
| 4,495,647 | A | * | 1/1985 | Burke et al. | 455/38 |
| 4,499,567 | A | * | 2/1985 | Armstrong | 340/825.44 |
| 4,518,827 | A | | 5/1985 | Sagara | |
| 4,549,047 | A | * | 10/1985 | Brian et al. | 179/18 B |
| 4,573,140 | A | * | 2/1986 | Szeto | 364/900 |
| 4,602,129 | A | * | 7/1986 | Matthews et al. | 179/18 B |
| 4,640,991 | A | * | 2/1987 | Matthews et al. | 379/88 |
| 4,652,857 | A | * | 3/1987 | Meiksin | 340/347 |
| 4,673,916 | A | * | 6/1987 | Kitamura et al. | 340/347 SH |
| 4,695,825 | A | * | 9/1987 | Bloy et al. | 340/347 SH |
| 4,731,811 | A | | 3/1988 | Dubus | |
| 4,742,560 | A | | 5/1988 | Arai | |
| 4,763,207 | A | | 8/1988 | Podolak et al. | |
| 4,772,873 | A | | 9/1988 | Duncan | |
| 4,864,301 | A | | 9/1989 | Helferich | |
| 4,865,321 | A | | 9/1989 | Nakagawa et al. | |
| 4,905,003 | A | | 2/1990 | Helferich | |
| 4,998,291 | A | | 3/1991 | Marui et al. | |
| 5,003,576 | A | | 3/1991 | Helferich | |
| RE34,976 | E | | 6/1995 | Helferich et al. | |

FOREIGN PATENT DOCUMENTS

| | | |
|---|---|---|
| EP | WO 86 05644 | 9/1986 |
| EP | 0 297 368 | 1/1989 |
| GB | 2 143 705 A | 2/1985 |
| GB | 2 181 624 A | 4/1987 |
| GB | WO 8 901 264 A | 2/1989 |
| JP | 52-21710 | 8/1975 |
| JP | 58-173923 | 10/1983 |
| JP | 60-174557 | 2/1984 |
| JP | 60-500037 | 1/1985 |
| JP | 60-91751 | 5/1985 |
| JP | 61-41264 | 2/1986 |
| JP | 61-225933 | 10/1986 |
| JP | 61-294961 | 12/1986 |
| JP | 62-257246 | 11/1987 |
| JP | 63-46044 | 2/1988 |
| JP | 63-104558 | 5/1988 |
| JP | 2-507071 | 11/1996 |

OTHER PUBLICATIONS

Advertisement for "Two tone, tone and Voice Pagers", ICM Communications, Radio Communications Report Oct. 16, 1988.*

Frank Goodenough, "Analog EEPROMs Store 16 Seconds of Audio on Silicon Die Jan. 10 The Area Digital EEPROMs Need To Do The Job," Electronic Design, Jan. 31, 1991, pp. 39–44.

Information Storage Devices, Inc., "Single Chip Voice Message System"; ISD 1016 Series, Mar. 1991, pp. 1–8.

Japanese Patent Abstracts of vol. 9, No. 325 (E–368) (2048) Dec. 20, 1985.

* cited by examiner

ANALOG/DIGITAL DATA STORAGE SYSTEM

Matter enclosed in heavy brackets [ ] appears in the original patent but forms no part of this reissue specification; matter printed in italics indicates the additions made by reissue.

*Continuation of application Ser. No. 08/229,744, filed on Apr. 19, 1994, abandoned which is a continuation of Ser. No. 07/761,172 filed on Aug. 30, 1991, abandoned which is a reissue of Ser. No. 07/077,496 filed on Jul. 24, 1987, now U.S. Pat. No. 4,905,003.*

FIELD OF THE INVENTION

The present invention relates to communication systems and more particularly to a system for the conversion of analog signals to digital for digital storage and for the retrieval and reconversion to analog format of such signals for playback.

BACKGROUND OF THE INVENTION

The prior art is replete with various types of paging systems and radio operated systems by which a message can be left for an individual who is not able to be contacted directly for one reason or another. For example, many paging systems operate with a large complex central processing facility in which messages are queued and transmitted, normally in digital form, to subscribers along with the subscriber's address code. The subscriber to the service carries a paging unit which is pre-programmed to activate upon receiving a message which is preceded by the address code for that paging unit. The pager then normally emits an audible sound to alert the subscriber that a message is being received and stored for him. The message is placed in the pager memory and the messages is retrieved in the form of a display message, normally on an LED or LCD display screen. Although such systems are efficient and require very little air time in order to send the digital message, the messages transmitted are necessarily of limited duration and are normally of the type which require the subscriber to go to the nearest telephone and call the message originator. In addition, unless the transmitted messages are strictly numeric, i.e. telephone numbers and the like, alpha numeric messages require a special terminal in order to input the alpha numeric message to be transmitted and paging systems of this type require expensive computerized central message facilities.

Other paging systems are available which utilize a transmitter which transmits in analog form an audio message preceded by an address code which is received by a pre-programmed receiver. The message is played immediately upon receipt and in some units the message can be recorded on a tape cassette for replay. Pagers of this type are normally relatively bulky and require substantially high power requirements to drive the mechanical portions of the tape recorder.

In the area of telephone communications, answering machines are available which are provided with one or more tape cassettes for playing a message to the caller to indicate that the called party is not available to answer the phone and to record a message for later playback. Although answering machines are readily available for single line use and their price is becoming more and more reasonable, such devices are normally not available as part of the telephone circuitry itself and most of the existing answering machines are bulky and require a substantial amount of desk top space.

Furthermore, answering machines are not readily available for multi-line business phones and com-line recording.

Yet another form of message service is the so called voice storage retrieval system (VMS) in which a voice message can be left at a central message storage facility and the subscriber, by use of a specific code, can access the memory at the central computer to retrieve the message. These systems are expensive to operate in view of the necessity of powerful computers at the central system facility to process and store the messages and in addition can be inconvenient to use since the subscriber must find a telephone in order to receive the message. In addition, messages may not be timely received because the addressee inadvertently fails to check for messages.

In the area of two-way radio communications, such as in the case of police and fire communications, emergency communications and the like where the addressee may be away from the mobile unit from time to time, many systems employ the use of hand held receivers, i.e. walkie-talkies, which may be patched into the mobile receiver for the receipt of incoming messages while the operator is away from the unit. Such devices are expensive and in many cases would be totally unnecessary if a reliable, inexpensive message storage system were available at the mobile unit. Some systems are available which are similar to the telephone answering machines for transmitting a prerecorded message and for recording incoming messages when the operator is not at the mobile unit. These systems have been found to be bulky, unreliable and inflexible in connection with radio communications. A more sophisticated system has been promulgated in U.S. Pat. No. 4,468,813 Burke et al, and in U.S. Pat. No. 4,495,647 Burke et al. This system requires a base unit which sends a command program packet in digital form to the mobile unit which is programmed to respond to the command program for receiving the message in analog form. Responsive to the command program, the mobile unit converts the message to digital form for storage and responsive to a termination command set in digital form by the base unit, the mobile unit recording system is deactivated. The operator at the mobile unit can then replay the digital message in analog form. The system as disclosed in the aforementioned U.S. Patents requires a sophisticated encoding system at the base transmitter which is capable of generating a command program packet and the termination code signal. Furthermore, the base transmitter must be capable of transmitting the command packet in the form described in the aforementioned patents. The mobile unit must be capable of receiving and decoding the command program packet and transmitting its own command program packet back to the base unit. The mobile unit utilized in such a system requires two separate power supplied which would render the device unsuitable for portable hand held receivers such as pagers and the like.

SUMMARY OF THE INVENTION

In accordance with the present invention there is provided an analog to digital data storage system which is readily adapted for use in communication systems such as paging systems, telephones, multi-line telephones, cellular telephones, intercom and telemetry systems, two-way radios, and the like, by which analog signals including voice messages and data transmission can be received, converted to digital format and stored in memory in digital format for retrieval, reconversion to analog form and playback as desired. The data storage system is easily installed on existing telephone and radio equipment at low cost and operates with very low power requirements. The data storage system is adapted to be activated by any conventional analog or digital address encoder such as, for example, digital code, tone, dual tone multiple frequency (DTMF) or may even be voice actuated (VOX). No specially modified transmitter is required for use with the system of the present invention. In addition the means for deactivating the circuitry after receipt of a message is contained within the data storage system itself and except for an address code (which is preferred but not critical), the necessity of transmitting a packet of command data to control the reception and recording of the message at the receiving unit and a termination code at the end of a message to deactivate the receiving unit is eliminated.

In accordance with the present invention the analog to digital data storage system includes receiver means for receiving an incoming signal carrying an analog component from a suitable transmitter. The analog signal is preferably preceded by a designated address code which is specific to a particular data memory system. The system further includes enable means activated by the incoming signal to emit an enable signal (logic high) to activate the system circuitry as will be hereinafter described and illustrated. The enable means may comprise a decoder which has been programmed to recognize an address code specified to a particular receiver or group of receivers. The enable means may also be activated by the incoming signal without an address code, such as in the case of a VOX circuit, to emit the enable signal. The system also includes conversion means for converting the incoming analog data to digital format and memory means for storing the converted digital data. The conversion means further includes circuitry for reconverting a digital signal to analog format. Control means are provided for activating the conversion means and the digital memory storage means responsive to the enable signal from the decoder means. In the preferred embodiment, the control means also acts to deactivate the conversion means and memory means at the completion of the message or after a predetermined period of time. Switching means are included for activating the conversion means and the memory means for playback in analog format of any stored messages. The system further includes amplifier means for listening to incoming analog signals and playback of stored messages.

The system of the present invention is readily adaptable for use with wire communication systems such as single and multi-line telephone systems, intercom systems and for radio communication. Thus the system of the present invention is useful for paging systems, two-way radio, cellular telephones, conventional telephone intercom systems, and telemetry systems. In a preferred form of the invention the system is adapted for receiving analog messages which are transmitted at high speed and for playback of such messages after retrieval from memory at a slow speed so that the message may be understood by the mobile operator. In this fashion, air transmission time is substantially reduced which is of critical importance in those areas where the radio frequencies are crowded, such as in paging systems where assigned frequencies are limited and there are a large number of subscribers utilizing the system.

BRIEF DESCRIPTION OF THE DRAWINGS

The invention will be best understood in conjunction with the following description when taken in conjunction with the accompanying drawings in which.

DESCRIPTION OF THE INVENTION

Figure 1:
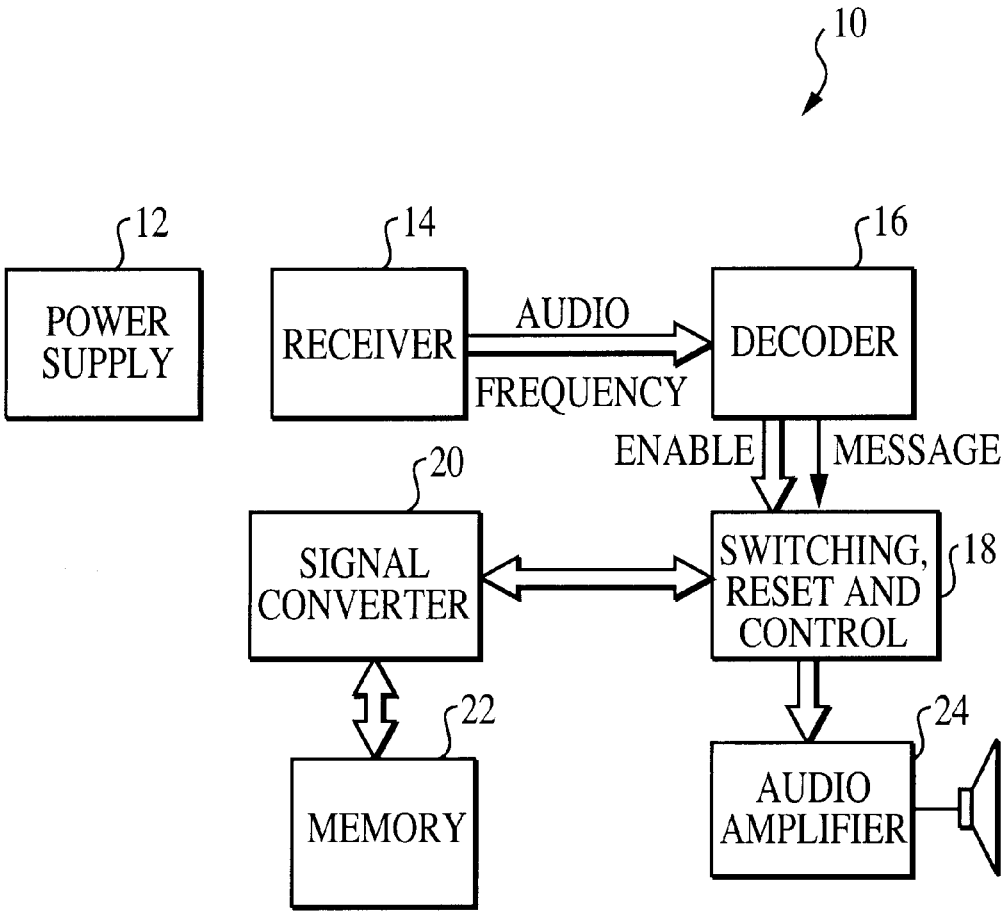
FIG. 1 is a block diagram of a digital voice storage system in accordance with the present invention.

Referring to FIG. 1 there is illustrated an analog to digital data memory system, indicated generally as 10, constructed in accordance with the present invention, which includes a power supply 12 and receiver means 14 for receiving incoming signals. The receiver means 14 may consists of a radio receiver such as would be utilized with an audio paging system or with two-way radio systems or may be a telephone or similar type device. As such, a transmitter (not shown) will also be included in system 10. The incoming system received by the receiving means are transmitted from any compatible transmitting device (not shown) which, as will be explained later, need not be especially modified for use with the receiver means 14 of the voice storage system 10. The transmitting medium may be hard wire or wireless such as, for example, radio, infrared or fiber optic. Enable means 16 is provided with decoder circuitry to compare the incoming signal with the decoder address to determine if the incoming message signal is addressed to the system 10. The enable means 16 can be adapted to monitor various types of encoded addresses such as, for example, digital code, tone code, or dual tone multiple frequency (DTMF). If the received signal code matches the decoder address, the decoder 16 issues an enable signal (pulse or continuous signal) which activates the record/store functions of the voice storage system 10. The use of an address code with the incoming message is not critical and if desired the enable can be simply a voice actuated device which issues the enable signal upon receipt of an audio message. In one embodiment of the invention, the decoder 16 is designed to emit a continuous enable signal during the duration of the incoming analog signal and the signal terminates at the end of the analog signal. The termination of the enable signal from the decoder 16 is utilized in other portions of the circuitry in a manner to be described in more detail hereinafter to deactivate the circuits of the system 10 and return it to the standby mode. In yet another embodiment of the invention, the decoder 16 issues a single pulse upon sensing an incoming message addressed to the system 10 and timer means are provided to return the system to the standby mode after the passage of a predetermined period of time from the initial enable pulse.

Control means 18 for switching, resetting and controlling the circuitry of the system 10 acts in response to the enable signal from the decoder 16 to control and activate the various circuits of the voice storage system 10. The incoming signal is passed on to the signal conversion means 20 for conversion from analog to digital format and on the memory means 22 for storage in memory in digital format. The control means 18 also includes switching circuitry for activating the voice storage system 10 independently of an enable signal to recall from memory the stored messages and to reconvert the messages from digital to analog format for replay.

Audio amplifier means 24 are provided for monitoring audio messages, both incoming and those retrieved from memory.

Figure 2:
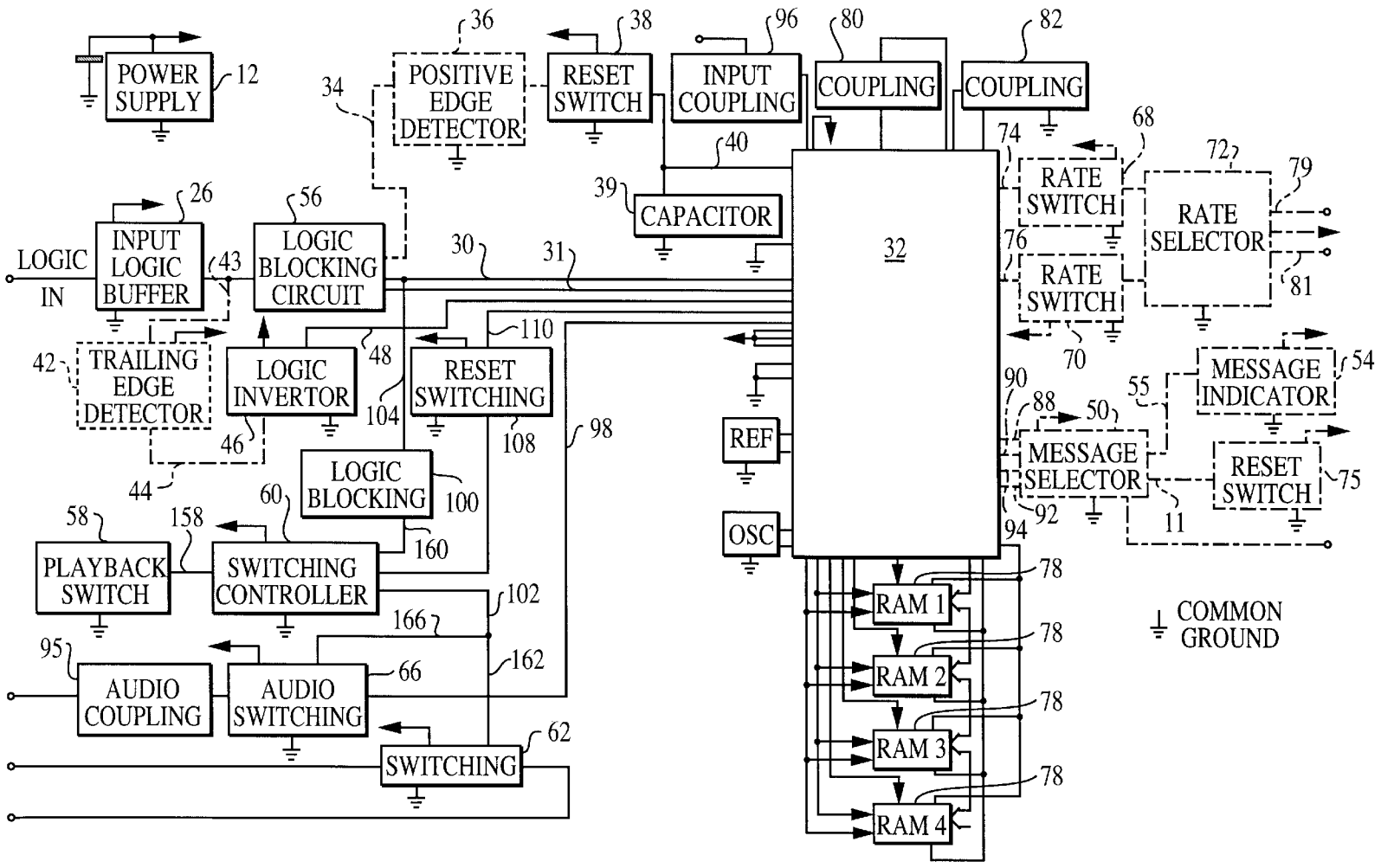
FIG. 2 is a block diagram of the audio conversion, switching and control circuits of FIG. 1.

Referring now to FIG. 2, there is shown a schematic diagram of the circuitry utilized in the control means 18, signal conversion means 20 and memory means 22 of the data memory system 10 illustrated in FIG. 1 As illustrated in FIG. 2, certain optional features of the system 10 are shown in phantom and it should be understood that the system 10 is operable without any of the optional features and that the selection of the particular optional feature to be incorporated in the circuit is a matter of choice dependent upon the nature of the receiver in which the system is installed and the selected operating parameters for the system.

The power supply 12 comprises any suitable source of power and preferably has a potential of at least 3 volts. The control means 18 electrically communicates with the decoder 16 (not shown) through an input logic buffer 26 to a logic blocking circuit 56. The logic blocking circuit 56, which is of conventional diode design, distributes the enable signal (logic high) through a start line 30 and a record/play line 31 to a microprocessor 32. When the enable means 16 is of the type that issues a continuous logic high during the duration of the analog signal, it is highly preferred to include circuitry for automatically returning the system 10 to the standby mode upon completion of the analog signal as indicated by a termination of the logic high. For this purpose, a trailing edge detector 42 is connected to a logic invertor 46 which in turn is connected to the microprocessor 32 through a stop line 48, the purpose and operation of which will be described in more detail hereinafter. The output analog signal is output from the microprocessor 32 through an analog output coupling 95 of conventional design. An audio switch 66 is connected to the microprocessor 32 by a line 98 for monitoring the analog signal during the record mode. For automatic resetting of the system 10 to permit a sender to record over messages already in memory, there may be included a positive edge detector 36 to which the logic high is conveyed from the logic blocking circuit 56 by means of a line 34. The positive edge detector 36 is of conventional design and is connected to the microprocessor 32 through a reset switch 38, a capacitor 39 and a reset line 40.

A playback switch 58 is connected to a switching controller 60. The switching controller 60, more clearly illustrated in FIG. 3, consists of an invertor 112 and an invertor 114 which are coupled by resistors 116 and 118 in a bi-stable (two stable state) circuit of conventional design whose output at lines 102 and 160 is normally low until inverted by activation of the switch 58 to initiate the playback mode. The output of the switching controller 60 remains high until it is inverted to its normal low by a reset switch 108.

The digital to analog conversion and analog to digital reconversion is accomplished by the microprocessor 32. The microprocessor 32 is manufactured by Toshiba under the model number T6668 and is provided with circuitry for converting analog to digital and reconverting digital to analog. Such conversion circuits are well known in the art and operate by generating an internal time base, sampling the analog signal input at some predetermined point in each of the time base segments, and then generating a digital output responsive to the sample level obtained during the sampling period. The microprocessor 32 is adapted for communication with up to four 256k bit chips 78 for a total of 1024k bit memory. In the embodiment of the invention illustrated in FIG. 2 the system 10, when utilizing all four RAM chips 78, can store up to 128 seconds of audio message at a BIT rate of 8K BPS.

In operation, an analog message, audio or data, is transmitted from a transmitter (not shown) to the receiver means 14 (FIG. 1). The message may be transmitted by any suitable means such as wire or wireless, and preferably is preceded by a designated address code of any of the commonly used types such as tone, DTMF, digital, or the like. The analog signal received by the receiver 14 is transmitted to the enable 16 which, if the proper designated code is present, of if the enable 16 is a VOX circuit, emits an enable signal (logic high) through the input logic buffer 26 to the logic blocking circuit 56. In the embodiment of the invention described thus far the decoder 16 is of the type which emits a continuous logic high for the duration of the incoming analog signal. The logic high is conveyed through logic blocking circuit 56, the start line 30 and the record/playback line 31 to the microprocessor 32. In addition, the logic blocking circuit 56 conveys a logic high through the line 34 to the positive edge detector 36 which emits a pulse to close the reset switch 38. In the closed position, the reset switch 38 completes the circuit to discharge the capacitor 39 momentarily pulling the reset line 40 to a logic low to initialize the microprocessor 32 for receiving a new message. The incoming analog signal, which for purposes of illustration is described as an audio message, is transmitted to the analog to digital conversion circuit of the microprocessor 32 through the input audio coupling 96. After conversion of the analog signal to digital format the converted signal is then conveyed to the RAM chip 78 for storage in memory. When reception of the analog signal ceases, the enable 14 terminates the logic high which activates the trailing edge detector 42 bringing it to a logic low. The logic low is indicated to the logic invertor 46 through the line 44 and the logic invertor inverts the low to a logic high which is conveyed through the stop line 48 to the microprocessor 32 to terminate the conversion and record process. Termination of the logic high also returns the start line 30 and the record/playback line 31 to their original standby logic low condition placing the system 10 in a standby mode in which very little power is required.

To retrieve and playback a digital message stored in the RAM memory, the operator activates the playback switch 58 to cause the switching controller 60 to issue a logic high through the line 160, logic blocking circuit 100, the line 104 and the start line 30 to the microprocessor 32 to activate the playback reproducing function.

At the same time the switching controller 60 outputs a logic high through the line 102 to simultaneously close the switches 62 and 66. The signal, which has been reconverted to analog format, is directed from the microprocessor 32 by the line 98 through the audio switch 66 and output audio coupler 95 to the amplifier means 24 (FIG. 1). Upon completion of the message reproduction and playback, the microprocessor 32 sends a logic high through the line 110 to the reset switch 108. The reset switch 108 resets the switching controller 60 to its original condition returning its output to a logic low and which returns the switches 66 and 62 to the open position. At this point the system 10 is in the standby mode and ready to receive a new incoming signal for conversion and storage.

In the embodiment of the invention thus described, it will be understood that there is no means for protecting a message in memory and upon receiving an incoming, properly addressed signal, the system is automatically reset and the incoming signal will be converted and stored over any message or data already in memory. The system 10, however, is readily adapted for the storage of a sequence of messages in memory and protection of stored messages by manual reset, the addition of memory address selection circuitry and by expansion of the memory.

As shown in FIG. 2 the positive edge detector is removed from the system 10 and the reset switch 38 is manually activated to reinitiate the microprocessor 32 in the manner already described to reset memory for recording over material already stored in memory. Up to three additional RAM chips 78, labeled as RAM 2, RAM 3 and RAM 4 may be included to expand memory. As illustrated, a memory address selector 50 which is a standard 4 BIT code counter circuit is connected to the microprocessor 32 making possible the selection of 16 different 4 BIT address combinations. It will be understood, however, that other address selector circuits may be employed such as 2 BIT counter circuits or manual selectors, as are well known in the art. The message address selector 50 is connected to the start line 30 for receipt of the logic high from the logic blocking circuit 56. A manual reset switch 75 is provided for resetting the message address to its initial address setting for the playback of messages stored in the memory. Playback of messages occurs in the manner already described except that with the positive edge detector 36 out of the circuit the reset switch 38 must be manually activated to discharge the reset line 40 in the manner already described to reset the microprocessor 32 for receiving new incoming analog signals.

In an alternative form of the invention, the system 10 may optionally employ a timer 52 in place of the trailing edge detector 42. The use of a time is particularly required when the decoder 16 is of the type which emits a single pulse in response to a properly addressed incoming signal.

Figure 3:
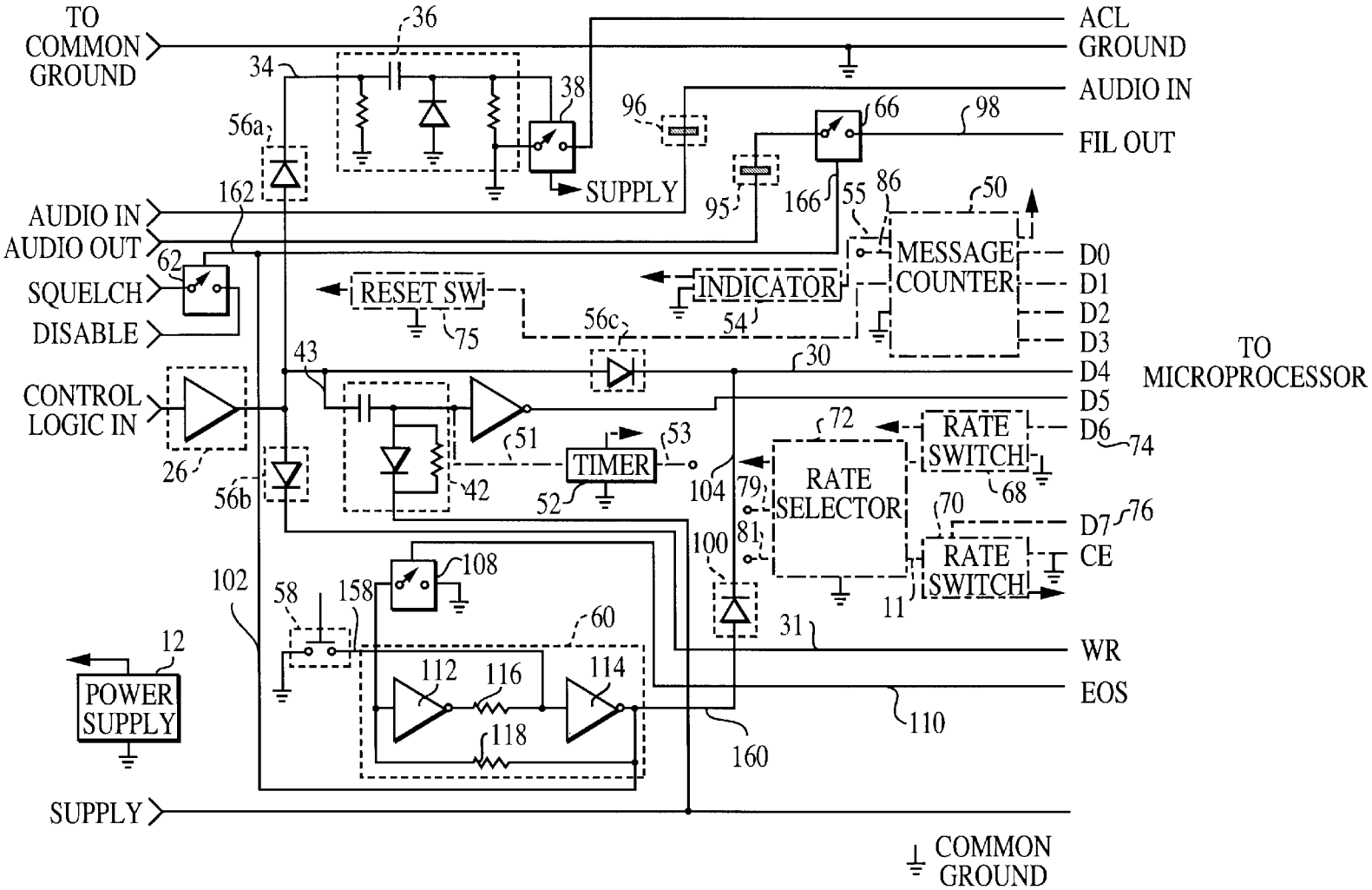
FIG. 3 is a schematic diagram showing in more detail the switching circuit.

As illustrated in FIG. 2 and FIG. 3 the trailing edge detector 42 and the line 44 are eliminated from the circuit and the timer 52, of conventional design, is connected by a line 53 to the line 43 for receiving the logic high from the input logic buffer 26. In operation, the timer 52 is initiated by the logic high and upon expiration of a preset period of time, issues a negative pulse to the logic invertor 46 which issues a logic high to the stop line 48 to place the system 10 in the standby mode in the manner already described.

As illustrated in FIG. 2, the system 10 may also include a message indicator 54 which signals the arrival of a signal and which may also indicate that memory space is full. The message indicator 54 may be a light, LED or a device for creating an audible tone. Such devices are well known in the art and do not, per se, form a part of this invention.

The embodiment of the system 10 illustrated in FIGS. 2 and 3 also optionally includes record/playback rate circuitry which enables the system to receive, convert and record messages at a one BIT rate and playback the messages at a different BIT rate. The maximum rate in BPS is determined by the particular microprocessor employed in the system and in the embodiment described herein the maximum rate is 32K BPS.

Figure 4:
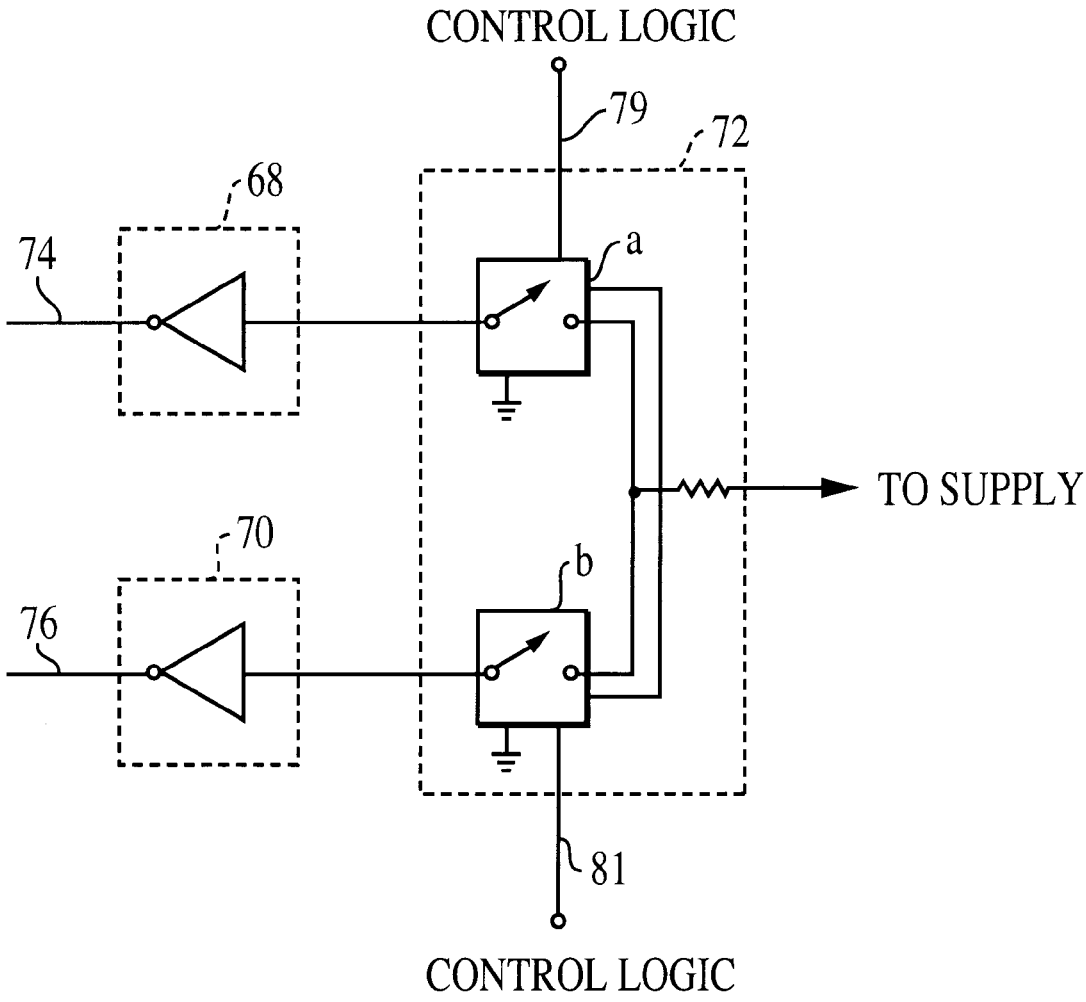
FIG. 4 is a schematic diagram of a portion of the switching portion of FIG. 2 illustrating the message rate control circuitry.

As is most clearly shown in FIG. 4, the rate circuitry includes invertors 68 and 70 which are connected to the microprocessor 32 by lines 74 and 76 respectively. A rate selector 72 which includes rate selector switches 72a and 72b is connected to the invertors 68 and 70. The rate selector 72 is also connected to the output of the switching controller 60 and 160 by lines 79 for control of playback speed.

As illustrated, the rate selector switches 72a and 72b are both open producing low input and high output at invertors 68 and 70 so that both lines 74 and 76 are high. In this condition the microprocessor will record and playback at the same rate of speed, in this case 32K BPS. When the playback switch 58 is closed the high output from the switching controller 60 passes through the line 79 to the rate selector which activates and closes rate selector switch 72a which causes a high input at invertor 68. In this configuration the output of the invertor 68 is low causing line 74 to be low while the output at the invertor 70 is high causing line 76 to be high. In this configuration the microprocessor will playback messages at a rate of 16K BPS. The BIT rate output is selected by 2 BIT codes so that 4 rates are selectable depending upon the positioning of the rate selector switches 72a and 72b (lines 79 and 81) during record and playback.

Figure 5:
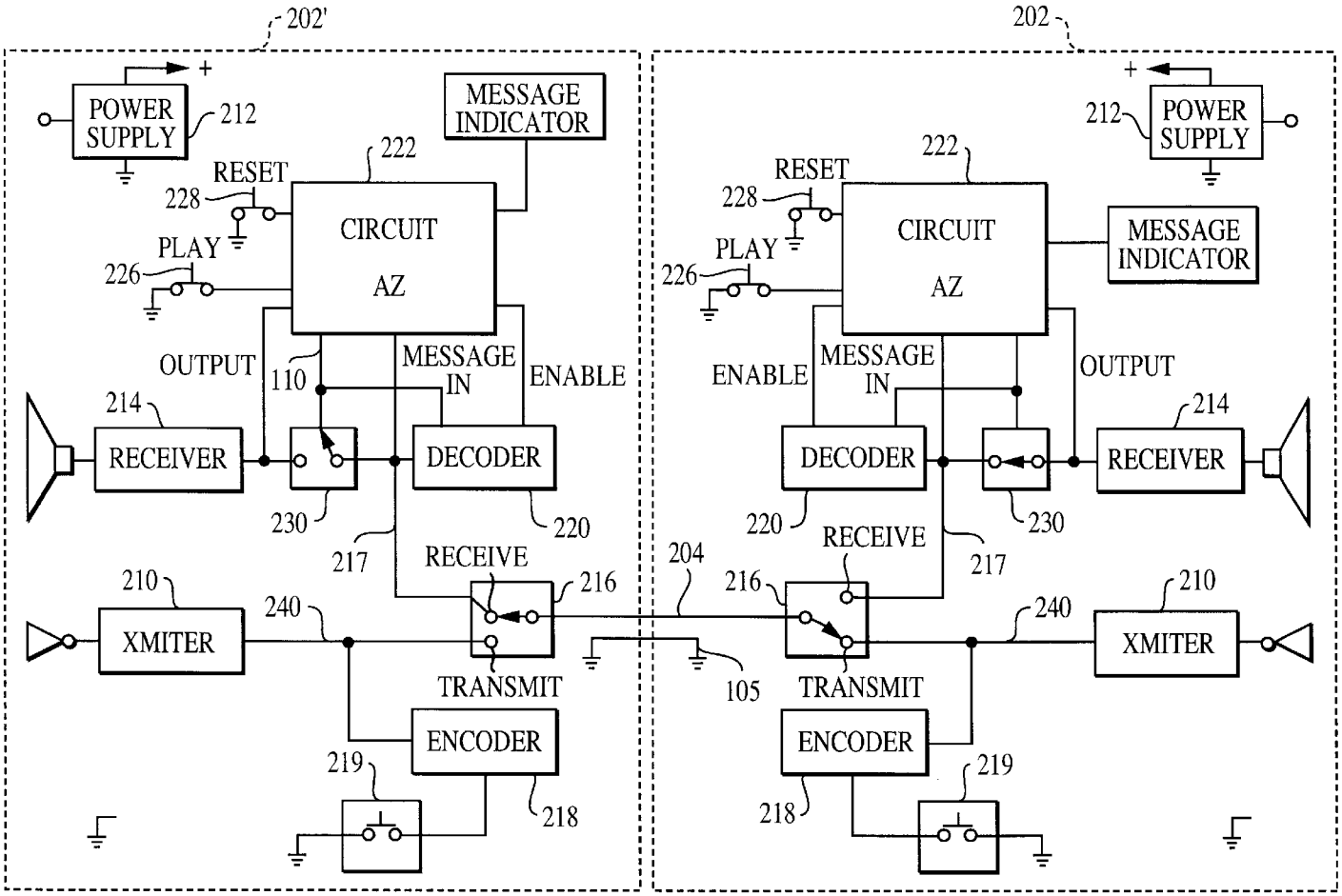
FIG. 5 is a block diagram of an intercom system utilizing the voice storage memory system of the present invention.

Referring now to FIG. 5 there is illustrated a telephone system incorporating an analog to digital data storage system in accordance with the invention. In the embodiment illustrated two transmitter/receivers, shown generally as 202 and 202', are connected by a wire 204 and a common ground 205 for intercommunication. Each transmitter/receiver 202 and 202' includes a power supply 212, a receiver means 214 and a transmitter means 210, as in the case of a conventional telephone. A send/receive switch 216 (push to talk) is provided in each transmitter/receiver 202 and 202' for making the transmitter circuit during transmission and for breaking the transmitter circuit 222 and completing the circuit to the receiver 214 during reception of a message. It will be understood that the send/receive switch 216 is provided for illustration purposes only and that full duplex intercom systems, telephone systems and telephone intercom systems are available which do not require such a switch for operation of the intercom or telephone system.

An encoder 218 and encoder switch 219 are connected into a line 240 to a transmitter 210. The encoder 218 may be of any of the types previously discussed and preferably would be of the DTMF type as used in most telephone systems. The receiver transmitters 202 and 202' also include a decoder 220 which is connected to an analog to digital data storage system 222 of the type previously described in connection with FIGS. 1, 2 and 3 above. The transmitter/receivers 202 and 202' both include a message indicator 224 which is activated to indicate that a message has been received and placed in memory. A playback switch 226 and a reset switch 228 are provided for each of the circuits 222 and a private switch 230 serves to switch the receiver 214 of the transmitter/receivers 202 and 202' out of the circuit so that messages being recorded cannot be heard while being recorded. The playback switch 226 may be replaced with an extra enable output (not shown) so that the playback function would be activated by entering a personal identification code through the key pad of a telephone (not shown).

The operation of the intercom system is illustrated in FIG. 5 with the transmitter/receiver 202 set to transmit with switch 216 completing the circuit between the transmitter 210 of receiver/transmitter 202 through the wire 204 to the receiver 214 of receiver/transmitter 202'. The receiver transmitter 202' is in the receive mode with its receive/transmitt switch 216 completing the circuit from the wire 204 to the analog to digital storage circuit 222 via line 217. To send a message from receiver/transmitter 202 to receiver/transmitter 202' for recording, the sender activates the encoder switch 219 of receiver/transmitter 202 to activate the encoder 218 which issues a code for transmission to the receiver/transmitter 202'. As mentioned above, the encoder switch 219 will preferably comprise the keypad of the telephone of similar device so that the sender can input a preprogrammed code for the receiver/transmitter 202'. Receiver/transmitter 202' is set for reception with the receive/transmit switch breaking the transmitter circuit and making the receiver circuit. As illustrated the privacy switch 230 is in the open position so that the messages received at the circuit 222 are not played back through the receiver 214 but are recorded only in the manner described hereinafter.

The enable 220 senses the message address and if addressed to receiver/transmitter 202' issues the logic high which is transmitted to the data storage circuit 222 through the enable line 221 which activates the circuit 222 in the manner described in conjunction with FIGS. 2 and 3. Conversion and recording of the analog message to digital form is carried out by the circuitry 222 in the manner described above in conjunction with FIG'S. 2 and 3. At the end of the message line 110 returns to its normally high state and switch 230 is closed to remake the receiver circuit. A message may be played back by activating the playback system 226 which initiates the playback circuitry so that messages in the memory are reconverted to analog form and outputted to the receiver 214.

It will be understood that a message may be transmitted, stored and played back in the transmitter/receiver 202 or 202' from any remote unit so long as the user of the remote unit is provided with the proper code to activate the enable 220. As previously mentioned it will be understood that the transmitter/receiver 202 and 202' may comprise two-way radios or other wireless transmitter/receivers such as those operating optically and the voice storage system 10 as illustrated and described in connection with the FIGS. 1, 2 and 3 may be readily installed in such transmitter/receivers.

As described herein the voice storage system of the present invention may be incorporated in various communication systems such as two-way radio, telephone, intercom, mobile telephone and the like. The voice storage system of the present invention will find application in medical recording, industrial monitoring, as an electronic note pad and the like in addition to paging systems. The system of the present invention is readily incorporated in various receivers and transmitter/receivers at the time of manufacture or may be incorporated in already existing conventional receivers and transmitter/receivers as an add-on item. The system of the present invention has low power requirements and thus is particularly well suited for use in paging systems where the remote receiver must be small and lightweight and of necessity has a limited power supply.

Having described the invention in connection with certain preferred embodiments thereof, it will be understood stood that many modifications and variations thereto are possible, all of which fall within the true spirit and scope of the invention.

Having described the invention I claim:

[1. A digital voice storage communication system including:

at least one transmitting station selectively addressing and transmitting a communication packet including an address code followed by a voice message;

at least two receiving stations having a corresponding predetermined stored address, each comprising:

a. a receiver circuit for receiving an incoming signal carrying said communication packet;

b. decoder circuitry responsive to said receiver circuit for emitting a record enable signal responsive to said communication packet carried by said incoming signal, including:

a comparator for comparing said predetermined stored address with said communication packet address code and automatically generating said record enable signal in response to said comparison, without reference to a separate record enable signal from said transmitter;

c. digital memory for storing said voice message of said communication packet in response to said record enable signal;

d. signal conversion circuitry for converting digital data in said digital memory into analog data for playback.]

[2. The digital voice storage communication system of claim 1, wherein said decoder circuitry further includes circuitry for deactivating said digital memory when said record enable signal ceases.]

[3. The digital voice storage communication system of claim 1, additionally comprising an edge detector responsive to said receiver circuits and sensitive to an edge of said record enable signal for automatically resetting and initiating said digital voice storage communication system to permit said digital memory to record a new voice message.]

[4. The digital voice storage communication system of claim 1, additionally comprising a memory address selector for storing information indicative of available memory space to protect said memory from recording over previously stored messages.]

[5. The digital voice storage communication system of claim 2, wherein said decoder circuitry terminates said enable signal upon sensing the completion of a message.]

[6. The digital voice storage communication system of claim 2, additionally comprising a timer, wherein said decoder is responsive to said timer to terminate said enable signal upon expiration of a preset period of time thereby enabling said digital memory to record a new voice message.]

[7. The digital voice storage communication system of claim 1, wherein said decoder circuitry generates said record enable signal continuously for the duration of said incoming voice message.]

[8. The digital voice storage communication system of claim 1, wherein said decoder circuitry is voice actuated to generate said record enable signal responsive to said incoming voice message.]

[9. The digital voice storage communication system of claim 1, further including a timing circuit for clocking said voice message into said digital memory at a first data rate and for clocking data representing a stored voice message from said digital memory at a second data rate which is different from said first data rate.]

[10. The digital voice storage communication system of claim 1, wherein said transmitting station further comprises:

a second memory for storing voice messages at a third rate; and a transmitting circuit for accessing voice messages from said second memory and transmitting said voice messages at a fourth rate, said fourth rate being higher than said third rate.]

[11. The digital voice storage communication system of claim 10, wherein said transmitting station further comprises an encoder generating said address code transmitted with said analog voice message in said communication packet.]

[12. A digital voice storage communication system as defined in claim 1, wherein said signal conversion circuitry converts said voice message of said communication packet from analog to digital format.]

[13. A digital voice storage communication system as defined in claim 1, wherein said communication packet additionally comprises command data and wherein said address code and said command data are followed with substantially no delay by said voice message in said communication data packet.]

[14. A digital voice storage communication system as defined in claim 1, wherein said communication packet includes a voice message whose length is variable.]

[15. A digital voice storage communication system as defined in claim 14, wherein said digital memory sequentially stores digital voice messages having different lengths.]

[16. A digital voice storage communication system as defined in claim 1, wherein said signal conversion circuitry operates during said record enable signal.]

[17. A digital voice storage communication system as defined in claim 1, additionally comprising:

an operator activated playback switch for retrieving said voice message stored in said digital memory and for activating said signal conversion circuitry.]

[18. A digital voice storage communication system as defined in claim 17, additionally comprising:

a switch for selection of said voice messages from said digital memory for conversion by said signal conversion circuitry.]

[19. A digital voice storage communication system as defined in claim 4, wherein said memory address selector generates a signal to erase the recorded voice message which has resided in said digital memory longer than any other stored message.]

[20. A digital voice storage communication system as defined in claim 1, wherein said digital memory records said voice messages silently.]

21. A digital voice storage communication system including:

at least one transmitting station selectively addressing and transmitting a communication packet including an address code followed by a voice message;

at least two receiving stations each having a corresponding predetermined stored address, each comprising:

a receiving circuit responsive to said communication packet;

a decoder connected to said receiving circuit and generating a record enable signal in response to said communication packet;

a digital memory for storing said voice message of said communication packet in response to said record enable signal at a first data rate;

a signal conversion circuit for converting digital data into analog data, and a timing circuit for clocking data representing said stored voice message from said digital memory at a second data rate which is different from said first data rate.

22. A digital voice storage communication system as defined in claim 21, wherein said decoder additionally comprises:

a comparator for comparing said predetermined stored address with said communication packet address code and automatically generating said record enable signal in response to said comparison, without reference to a separate record enable signal from said transmitter.

23. A digital voice storage communication system as defined in claim 21, wherein said conversion circuit converts said voice message of said communication packet from analog to digital format recording in said digital memory at said first data rate.

24. A digital voice storage communication system as defined in claim 21, wherein said signal conversion circuit terminates conversion of said voice message in said communication packet from analog data to digital data when said decoder ceases to generate said record enable signal.

25. A digital voice storage communication system as defined in claims 21, additionally comprising:

an edge detector circuit for automatic resetting of the digital voice storage communication system to permit said digital memory to record a new voice message.

26. A digital voice storage communication system as defined in claim 21, additionally comprising:

a timer for terminating said signal conversion circuit upon expiration of a predetermined period of time thereby enabling said digital memory to record a new voice message.

27. A digital voice storage communication system as defined in claim 21, wherein said communication packet has a voice message whose length is variable.

28. A digital voice storage communication system as stored in claim 21, wherein said digital memory sequentially stores digital voice messages having different lengths.

29. A digital voice storage communication system as defined in claim 21, additionally comprising:

an operator activated playback switch for retrieving said voice message stored in said digital memory and for initiating clocking of analog data representing said stored voice message at said second data rate.

30. A digital voice storage communication system defined in claim 21, additionally comprising:

a message indicator for alerting an operator of said voice message being received and recorded in said digital memory.

31. A digital voice storage communication system as defined in claim 21, wherein said communication packet additionally includes command data wherein said address code and said command data is followed with substantially no delay by said voice messages in said communication data packet.

32. A digital voice storage communication system as defined in claim 21, additionally comprising:

a record switch for allowing an operator to dictate messages for storing in said digital memory at said second rate.

33. A digital voice storage communication system as defined in claim 21, wherein said transmitting station additionally comprises:

a second memory for storing voice messages at a third rate, and a transmitting circuit for accessing voice messages from said second memory and transmitting said voice messages at a fourth rate, said fourth rate being higher than said third rate.

34. A digital voice storage communication system as defined in claim 33, wherein said fourth rate is equal to said first rate.

35. A digital voice storage communication system as defined in claim 33, wherein said second memory stores messages in a stacked, sequential order.

36. A digital voice storage communication system as defined in claim 21, additionally comprising:

counter circuitry for monitoring said voice messages being recorded in said digital memory, said digital memory when full, simultaneously initializing said counter circuitry and enabling said digital memory to erase an oldest recorded voice message first.

37. A digital voice storage communication system as defined in claim 21, additionally comprising:

a message indicator for alerting an operator of said voice messages previously stored in said digital memory.

38. A digital voice storage communication system as defined in claim 21, wherein said communication packet additionally comprises:

rate data defining said first data rate.

39. A receiving station for receiving a communication packet including an address code followed by a compressed voice message, comprising:

a register storing a predetermined address for said receiving station;

a receiving circuit responsive to said communication packet;

a decoder connected to said receiving circuit for comparing said predetermined stored address with said communication packet address code and generating a record enable signal in response to said comparison;

a digital memory for storing said compressed voice message of said communication packet in response to said record enable signal at a first data rate;

a signal conversion circuit for converting digital data into analog data, and a timing circuit for clocking data representing said stored compressed voice message from said digital memory at a second data rate which is slower than said first data rate to restore said voice message to its original frequency.

40. A receiver for receiving voice messages from a transmitter, the voice messages having been compressed at said transmitter thereby shifting their frequency upward, comprising:

a receiving circuit for receiving said compressed voice messages;

a digital memory connected to said receiving circuit, said digital memory storing digital data representing said compressed voice messages; and a frequency shifting circuit connected to said memory for reproducing said stored voice messages in analog format at a rate which shifts the frequency of said stored voice messages to normal speech frequency.

41. A method of receiving a communication packet including an address code followed by a compressed voice message, comprising the steps of:

comparing said address code in said communication packet with a stored address and generating a record enable signal; and recording digital data representing said voice message in a digital memory in response to said record enable signal alone.

*42. A method of operating a paging receiver which receives information transmitted from an external source, including coded information having an address, followed by associated analog information having at least one compressed analog voice message, said method comprising the steps of:*

*(a) receiving the information and decoding the coded information to recover the address;*

*(b) selectively enabling the receiver correlating to the decoded address to recover the compressed analog voice message from the received analog information;*

*(c) responding solely to the presence of the recovered compressed analog voice message to convert said compressed analog voice message to digital information, the digital information representative of a replica of the originally received compressed analog voice message; and*

*(d) storing at least part of the digital information in a memory of the selected receiver.*

*43. The method of claim 42 further including the step of:*

*(e) generating an alert signal at the selected receiver indicating receiving the compressed analog voice message.*

*44. The method of claim 43 further including the step of:*

*(f) generating an alert signal after storing the compressed analog voice message.*

*45. The method of claim 43 wherein the step of generating an alert signal further includes the step of:*

*(g) generating an alert signal approximately when the paging receiver is selected.*

*46. The method or claim 43 wherein the selected paging receiver includes a control switch, said method further including the steps of:*

*(h) sensing the activation of the control switch and generating an electrical signal in response thereto;*

*(i) in response to the electrical signal, reconverting the digital information to decompressed analog information; and*

*(j) producing audible voice information from the decompressed analog information, the audible voice information being a replica of the original compressed analog voice message that is decompressed.*

*47. The method of claim 46 wherein a plurality of digital voice messages are stored chronologically in the paging receiver, said method further including the step of:*

*(k) repeatedly activating the control switch for initiating playback of a chronologically stored voice message, wherein the Nth activation of the switch initiates replay of the Nth stored voice message.*

*48. The method of claim 47 further including the step of:*

*(l) activating the control switch for returning the paging receiver to a standby condition when all of the stored voice messages have been replayed.*

*49. The method of claim 47 further including the steps of:*

*(m) interrupting the playback of a stored message upon receipt of new analog information intended for the receiver;*

*(n) recovering a new compressed analog voice message from said new analog information;*

*(o) converting the new compressed analog voice message to new digital voice information; and*

*(p) storing the new digital voice information in the memory.*

*50. A digitized voice paging device comprising:*

*(a) means for receiving information transmitted from an external source, the information including coded information having an address, and associated analog information having at least one compressed analog voice message;*

*(b) means for decoding the coded information to recover the address to determine whether the associated analog information is intended for the paging device;*

*(c) means governed by the decoding means to recover the compressed analog voice message from the received analog information;*

*(d) means governed solely by said decoding means and the presence of the recovered compressed analog voice message to convert said compressed analog voice message to a compressed digital voice message which is representative of a replica of the originally received compressed analog voice message;*

*(e) memory means for storing at least part of the compressed digital voice message.*

*51. The paging device of claim 50 further including:*

*(f) an alerting means for generating an alert signifying receipt of information after storing the compressed digital voice message.*

*52. The paging device of claim 50 wherein said memory means is operably coupled to said converting means for providing a compressed digital stored voice message to said converting means, wherein said converting means is operative to reconvert the compressed digital voice message into audible information representative of the originally received compressed analog voice message that is decompressed.*

53. The paging device of claim 50 further comprising:

(g) means for operating the decoding means in one of a plurality of operating modes.

54. The paging device of claim 53 wherein one of the operating modes stores the compressed digitized voice message and then generates an alert to notify the user of the receipt of the message.

55. The paging device of claim 50 further including:

(h) control means, coupled to said decoding means and said converting means, for sensing activation of a control switch, said control means generating an electrical signal in response to activation of the control switch; and (i) transducer means, coupled to said control means, for outputting an audible signal; wherein said converting means, in response to the electrical signal, recalls the compressed digital message from memory and reconverts the digital message to an analog signal that is a replica of the original compressed analog message that is decompressed, and further wherein said transducer means receives the analog signal from said control means, coupled to said converting means, to output an audible signal.

56. The paging device of claim 50 further including:

(i) a means for generating an indication upon memory means being full.

57. The paging device of claim 50 further including:

(j) a means for counting the number of messages received.

58. A digitized voice paging device comprising:

(a) first means for receiving information transmitted from an external source, the information including a coded address and at least one compressed analog voice message;

(b) second means for decoding the coded address to determine whether the at least one compressed analog voice message is intended for the paging device;

(c) third means governed solely by said second means, and the presence of the at least one compressed analog voice message for converting the at least one compressed analog voice message to at least one compressed digital voice message; and (d) fourth means for storing the at least one compressed digital voice message in a memory.

59. A paging device as defined in claim 58, further comprising:

a memory address selector for storing information indicative of available memory space to protect said fourth means from storing over previously stored messages.

60. A paging device as defined in claim 58, wherein said information transmitted from the external source further includes command data, wherein said coded address and said command data are followed with substantially no delay by the at least one compressed analog voice message.

61. A paging device as defined in claim 58, wherein the length of said at least one compressed analog voice message is variable.

62. A paging device as defined in claim 58, wherein said fourth means sequentially stores compressed digital voice messages having different lengths.

63. A paging device as defined in claim 58, further comprising:

(e) fifth means for retrieving the stored compressed digital voice message from memory in response to an operator activated playback switch; and (f) sixth means for converting the retrieved compressed digital voice message to decompressed analog format.

64. A paging device as defined in claim 63, further comprising:

(g) seventh means for audibilizing the decompressed analog voice message.

65. A paging device as defined in claim 63, wherein said fifth means includes means for selectively retrieving a stored compressed digital voice message from a plurality of stored compressed digital voice messages.

66. A paging device as defined in claim 59, wherein said memory address selector generates a signal to erase the stored compressed digital voice message which has resided in memory longer than any other stored compressed digital voice message.

67. A paging device as defined in claim 58, wherein said fourth means stores the compressed digital voice message silently.

68. A paging device as defined in claim 58, comprising:

a message indicator for alerting an operator of the at least one compressed analog voice message being received.

69. A paging device as defined in claim 58, further comprising:

a message indicator for alerting an operator after the compressed voice message has been stored.

70. A paging device as defined in claim 58, further comprising:

an indicator for alerting an operator that the memory is full.

71. A paging device as defined in claim 58, further comprising:

eighth means for counting the number of compressed voice messages received.

72. A method of operating a paging receiver which receives information transmitted from an external source, including coded information having an address, followed by associated information having at least one compressed voice message, said method comprising the steps of:

(a) receiving the information and decoding the coded information to recover the address;

(b) selectively enabling the receiver correlating to the decoded address to recover the compressed voice message from the received information;

(c) responding solely to the presence of the recovered compressed voice message to convert said compressed voice message to timed samples representative of the originally received compressed voice message; and (d) storing the timed samples representative of at least a part of the compressed voice message in a memory of the selected receiver.

73. The method of claim 72 further including the step of:

(e) generating an alert signal at the selected receiver indicating receiving the compressed voice message.

74. The method of claim 73 further including the step of:

(f) generating an alert signal after storing the timed samples representative of at least a part of the compressed voice message.

75. The method of claim 73 wherein the step of generating an alert signal further includes the step of:

(g) generating an alert signal approximately when the paging receiver is selected.

76. The method of claim 73 wherein the selected paging receiver includes a control switch, said method further including the steps of:

(h) sensing the activation of the control switch and generating an electrical signal in response thereto;

(i) *in response to the electrical signal, reconverting the stored timed samples to produce a decompressed form of the compressed voice message; and*

(j) *producing audible voice information from the decompressed form of the compressed voice message, the audible voice information being a replica of the original compressed voice message that is decompressed.*

*77. The method of claim 76 wherein a plurality of voice messages are stored chronologically in the paging receiver, said method further including the step of:*

(k) *repeatedly activating the control switch for initiating playback of a chronologically stored voice message, wherein the Nth activation of the switch initiates replay of the Nth stored voice message.*

*78. The method of claim 77 further including the step of:*

(l) *activating the control switch for returning the paging receiver to a standby condition when all of the stored voice messages have been replayed.*

*79. The method of claim 77 further including the steps of:*

(m) *interrupting the playback of a stored message upon receipt of new information intended for the receiver;*

(n) *recovering a new compressed voice message from said new information;*

(o) *converting the new compressed voice message to timed samples representative of the new compressed voice message; and*

(p) *storing the timed samples in the memory.*

*80. A voice paging device comprising:*

(a) *means for receiving information transmitted from an external source, the information including coded information having an address, and associated information having at least one compressed voice message;*

(b) *means for decoding the coded information to recover the address to determine whether the associated information is intended for the paging device;*

(c) *means governed by the decoding means to recover the compressed voice message from the received information;*

(d) *means governed solely by said decoding means and the presence of the recovered compressed voice message to convert said compressed voice message to timed samples representative of the originally received compressed voice message;*

(e) *memory means for storing the timed samples representative of at least part of the compressed voice message.*

*81. The paging device of claim 80 further including:*

(f) *an alerting means for generating an alert signifying receipt of information after storing the timed samples representative of at least part of the compressed voice message.*

*82. The paging device of claim 80 wherein said memory means is operably coupled to said converting means for providing the timed samples representative of at least part of the compressed voice message to said converting means, wherein said converting means is operative to reconvert the timed samples into audible information representative of the originally received compressed voice message that is decompressed.*

*83. The paging device of claim 80 further comprising:*

(g) *means for operating the decoding means in one of a plurality of operating modes.*

*84. The paging device of claim 83 wherein one of the operating modes stores the timed samples representative of the compressed voice message and then generates an alert to notify the user of the receipt of the message.*

*85. The paging device of claim 80 further including:*

(h) *control means, coupled to said decoding means and said converting means, for sensing activation of a control switch, said control means generating an electrical signal in response to activation of the control switch; and*

(i) *transducer means, coupled to said control means, for outputting an audible signal; wherein said converting means, in response to the electrical signal, recalls the timed samples from memory and reconverts the timed samples to a signal that is a replica of the original compressed analog message that is decompressed, and further wherein said transducer means receives the signal from said control means, coupled to said converting means, to output an audible signal.*

*86. The paging device of claim 80 further including:*

(i) *a means for generating an indication upon memory means being full.*

*87. The paging device of claim 80 further including:*

(j) *a means for counting the number of messages received.*

*88. A voice paging device comprising:*

(a) *first means for receiving information transmitted from an external source, the information including a coded address and at least one compressed voice message;*

(b) *second means for decoding the coded address to determine whether the at least one compressed voice message is intended for the paging device;*

(c) *third means governed solely by said second means and the presence of the at least one compressed voice message for converting the at least one compressed voice message to timed samples representative of said at least one compressed voice message; and*

(d) *fourth means for storing the timed samples in a memory.*

*89. A paging device as defined in claim 88, wherein said second means comprises:*

*a comparator for comparing a predetermined stored address of said paging device with said coded address and, in response to said comparison, automatically generating a record enable signal, without reference to a separate record enable signal from the external source, for initiating converting and storing of the at least one compressed voice message.*

*90. A paging device as defined in claim 89, wherein said second means further comprises:*

*means for deactivating said fourth means when said record enable signal ceases.*

*91. A paging device as defined in claim 89, further comprising:*

*an edge detector sensitive to an edge of said record enable signal for automatically resetting and initiating said paging device to permit said fourth means to store a new compressed voice message.*

*92. A paging device as defined in claim 88, further comprising:*

*a memory address selector for storing information indicative of available memory space to protect said fourth means from storing over previously stored messages.*

*93. A paging device as defined in claim 90, wherein said second means terminates said record enable signal upon sensing the completion of a message.*

*94. A paging device as defined in claim 90, further comprising:*

*a timer wherein said second means is responsive to said timer to terminate said record enable signal upon expiration of a preset period of time.*

*95. A paging device as defined in claim 89, wherein said second means generates said record enable signal continuously for the duration of the received compressed analog voice message.*

*96. A paging device as defined in claim 88, wherein said second means comprises:*

*voice actuated means for generating a record enable signal in response to the incoming at least one compressed voice message, without reference to a separate record enable signal from the external source, to initiate converting and storing of the at least one compressed voice message.*

*97. A Raging device as defined in claim 88, wherein said information transmitted from the external source further includes command data, wherein said coded address and said command data are followed with substantially no delay by the at least one compressed voice message.*

*98. A paging device as defined in claim 88, wherein the length of said at least one compressed voice message is variable.*

*99. A paging device as defined in claim 88, wherein said fourth means sequentially stores timed samples representative of compressed voice messages having different lengths.*

*100. A paging device as defined in claim 89, wherein said third means operates during said record enable signal.*

*101. A paging device as defined in claim 88, further comprising:*

*(e) fifth means for retrieving the stored timed samples representative of a compressed voice message frommemory in response to an operator activated playback switch; and*

*(f) sixth means for converting the retrieved timed samples representative of the compressed voice message to decompressed format.*

*102. A paging device as defined in claim 101, further comprising:*

*(g) seventh means for audibilizing the decompressed voice message.*

*103. A paging device as defined in claim 101, wherein said fifth means includes means for selectively retrieving timed samples representative of a stored compressed voice message from a plurality of stored compressed voice messages.*

*104. A paging device as defined in claim 92, wherein said memory address selector-generates a signal to erase the stored timed samples representative of a compressed voice message which has resided in memory longer than any other stored timed samples representative of any other compressed voice message.*

*105. A paging device as defined in claim 88, wherein said fourth means stores the timed samples representative of the compressed voice message silently.*

*106. A paging device as defined in claim 88, comprising:*

*a message indicator for alerting an operator of the at least one compressed voice message being received.*

*107. A paging device as defined in claim 88, further comprising:*

*a message indicator for alerting an operator after the timed samples representative of the compressed voice message have been stored.*

*108. A paging device as defined in claim 88, further comprising:*

*an indicator for alerting an operator that the memory is full.*

*109. A paging device as defined in claim 88, further comprising:*

*eighth means for counting the number of compressed voice messages received.*

*110. A voice storage communication system including:*

*at least one transmitting station selectively addressing and transmitting a communication packet including an address code followed by a voice message;*

*a receiving circuit responsive to said communication packet;*

*a decoder connected to said receiving circuit and generating a record enable signal in response to said communication packet;*

*a message recording circuit recording timed samples representative of said voice message of said communication packet in a memory in response to said record enable signal at a first data rate;*

*playback circuitry for reproducing said voice message from said timed samples, and*

*a timing circuit for clocking said timed samples from said memory at a second data rate which is different from said first data rate.*

*111. A voice storage communication system as defined in claim 110, wherein said decoder additionally comprises:*

*a comparator for comparing said predetermined stored address with said communication packet address code and automatically generating said record enable signal in response to said comparison, without reference to a separate record enable signal from said transmitter.*

*112. A voice storage communication system as defined in claim 111, wherein said message recording circuit terminates recording of said timed samples when said decoder ceases to generate said record enable signal.*

*113. A voice storage communication system as defined in claim 110, additionally comprising:*

*an edge detector circuit for automatic resetting of the voice storage communication system to permit said memory to record tired samples representative of a new voice message.*

*114. A voice storage communication system as defined in claim 110, additionally comprising:*

*a timer for terminating said message recording circuit upon expiration of a predetermined period of time thereby enabling said memory to record timed samples representative of a new voice message.*

*115. A voice storage communication system as defined in claim 110, wherein said communication packet has a voice message whose length is variable.*

*116. A voice storage communication system as defined in claim 110, wherein said memory sequentially stores timed samples representative of voice messages having different lengths.*

*117. A voice storage communication system as defined in claim 110, additionally comprising:*

*an operator activated playback switch for retrieving said timed samples stored in said memory and for initiating clocking of timed samples representing said stored voice message at said second data rate.*

*118. A voice storage communication system as defined in claim 110, additionally comprising:*

*a message indicator for alerting an operator of said voice message being received and recorded in said memory.*

*119. A voice storage communication system as defined in claim 110, wherein said communication packet additionally includes command data wherein said address code and said command data is followed with substantially no delay by said voice messages in said communication data packet.*

*120. A voice storage communication system as defined in claim 110, additionally comprising:*

*a record switch for allowing an operator to dictate messages for storing in said memory at said second rate.*

*121. A voice storage communication system as defined in claim 110, wherein said transmitting station additionally comprises:*

*a second message recording circuit recording timed samples representative of voice messages in a second memory at a third rate, and*

*a transmitting circuit for accessing said timed samples from said second memory and transmitting said timed samples at a fourth rate, said fourth rate being higher than said third rate.*

*122. A voice storage communication system as defined in claim 121, wherein said fourth rate is equal to said first rate.*

*123. A voice storage communication system as defined in claim 121, wherein said second memory stores timed samples representative of messages in a stacked, sequential order.*

*124. A voice storage communication system as defined in claim 110, additionally comprising:*

*counter circuitry for monitoring said voice messages being recorded in said memory, said memory when full, simultaneously initializing said counter circuitry and enabling said memory to erase an oldest recorded voice message first.*

*125. A voice storage communication system as defined in claim 110, additionally comprising:*

*a message indicator for alerting an operator of said voice messages previously stored in said memory.*

*126. A voice storage communication system as defined in claim 110, wherein said communication packet additionally comprises:*

*rate data defining said first data rate.*

*127. A receiving station for receiving a communication packet including an address code followed by a compressed voice message, comprising:*

*a register storing a predetermined address for said receiving station;*

*a receiving circuit responsive to said communication packet;*

*a decoder connected to said receiving circuit for comparing said predetermined stored address with said communication packet address code and generating a record enable signal in response to said comparison;*

*a message recording circuit recording timed samples representative of said compressed voice message of said communication packet in a memory in response to said record enable signal at a first data rate;*

*a playback circuit for reproducing said voice message from said timed samples, and*

*a timing circuit for clocking said timed samples representative of said stored compressed voice message from said memory at a second data rate which is slower than said first data rate to restore said voice message to its original frequency.*

*128. A receiver for receiving voice messages from a transmitter, the voice messages having been compressed at said transmitter thereby shifting their frequency upward, comprising:*

*a receiving circuit for receiving said compressed voice messages;*

*a message recording circuit connected to said receiving circuit, said message recording circuit recording timed samples representing said compressed voice messages: and*

*a frequency shifting circuit connected to said message recording circuit for reproducing said stored voice messages from said timed samples at a rate which shifts the frequency of said stored voice messages to normal speech frequency.*

*129. A method of receiving a communication packet including an address code followed by a compressed voice message, comprising the steps of:*

*comparing said address code in said communication packet with a stored address and generating a record enable signal; and*

*recording timed samples representing said voice message in a memory in response to said record enable signal alone.*

* * * * *